United States Patent [19]

Czebieniak

[11] Patent Number: 5,279,073
[45] Date of Patent: Jan. 18, 1994

[54] VINE STAKE

[76] Inventor: Adolph S. Czebieniak, 21 Pinewood Dr., Milltown, N.J. 08850

[21] Appl. No.: 757,002

[22] Filed: Sep. 9, 1991

[51] Int. Cl.$^5$ .................................................. A01G 17/06
[52] U.S. Cl. ............................................. 47/48.5; 47/47; 47/58
[58] Field of Search .................. 47/47, 48.5, 44, 46, 47/26, 27, 58; 256/1, 47, 48

[56] References Cited

U.S. PATENT DOCUMENTS

| | | | |
|---|---|---|---|
| 322,359 | 7/1885 | Droege | 256/48 |
| 550,532 | 11/1895 | Rozell | 256/47 |
| 1,984,265 | 12/1934 | Hamer | 47/49 |
| 2,214,083 | 9/1940 | Lester | 277/4 |
| 2,333,727 | 11/1943 | Lucas | 47/49 |
| 2,595,782 | 5/1952 | Epstein | 47/48.5 |
| 2,809,468 | 10/1957 | Eliot | 47/44 |
| 3,345,774 | 10/1967 | Delbuguet | 47/48.5 |
| 3,447,263 | 6/1969 | Johnson | 47/17 |
| 4,089,133 | 5/1978 | Duncan | 47/48.5 |
| 4,223,837 | 9/1980 | Gubbiotti | 239/50 |
| 4,291,836 | 9/1981 | Chen-Hsiung | 239/37 |
| 4,745,706 | 5/1988 | Muza et al. | 47/47 |
| 4,970,823 | 11/1990 | Chen et al. | 47/48.5 |
| 5,011,107 | 4/1991 | Reece | 256/1 |

FOREIGN PATENT DOCUMENTS

| | | | |
|---|---|---|---|
| 667740 | 7/1963 | Canada | 256/47 |
| 445816 | 3/1968 | Switzerland | 256/47 |

*Primary Examiner*—Henry E. Raduazo
*Attorney, Agent, or Firm*—Robert L. Stone

[57] ABSTRACT

A vine stake having a sharp point at its lower end for penetrating soil adjacent to a growing vine, a solid flat upper end and along the exterior of its body, a plurality of protruding nodules or ruffles upon which vine-tieing ropes or straps can be rested. Desirably the vine stake comprises a hollow core below a solid flat upper end and is adapted for sub-irrigating vine roots by containing an ingress hole on the exterior of its body through which water or fertilizer solution or suspension can be introduced and also a plurality of egress holes in the exterior of its lower portion through which the water or liquid fertilizer can exit below the soil.

18 Claims, 8 Drawing Sheets

VINE STAKE

This invention relates to a vine stake.

PAST PRACTICE

In past practice, vine stakes have suffered from major disadvantages. For instance they may not penetrate deeply in the soil and can, therefore, easily fall due to wind or soft damp soil. Ropes or straps for tieing vines to stakes can also slip. These problems can cause considerable vine damage.

A tomato stake which is also adapted to introduce water below ground level is described in U.S. Pat. No. 4,745,706 to Muza et al. Snap-on straps are mounted in vertical grooves to tie the vine to the stake. No stops are provided and the straps could readily slip downward in their grooves, thereby causing vine damage.

Stabilized tieing is described in U.S. Pat. No. 3,345,774 to Delbuguet wherein oppositely positioned holes in two adjacent sides of a rectangular hollow outer tube are present through which ropes or rods can be inserted. This stake requires a complicated structure wherein the ropes or rods must penetrate inside the stake.

In U.S. Pat. No. 2,809,468 to Eliot a single looped strap is attached to the top of a plant prop. The prop with a single loop for directing plant growth is not suitable for a vine type outdoor plant such as a tomato plant.

THE INVENTION

It is an advantage of this invention that nodules or ruffles are provided on a vine stake to permit secure and stable positioning of vine tieing ropes or cords thereon, thereby permitting secure and stable positioning of a vine plant upwardly along the stake.

It is an advantage of an aspect of the invention that sub-irrigation of soil is effectively provided from the vine stake.

Other advantages will be apparent from consideration of the following disclosure.

In accordance with certain of its aspects, this invention relates to a vine stake comprising a sharp point at its lower end, a solid flat upper end and along the exterior of the body of said vine stake a plurality of protruding nodules or ruffles suitable for placement of vine branch-tieing ropes or cords.

In accordance with certain further of its aspects, this invention relates to a sub-irrigating vine stake comprising a sharp point at its lower end, a solid flat upper end, a hollow body between the solid bottom of said upper end and the top of the interior of said sharp point, an ingress hole on at least one side of said vine stake entering into said hollow body, said ingress hole being positioned approximately 25 to 40% of the entire length of said vine stake below the top of said upper end, a plurality of egress holes in said hollow body near said lower end positioned approximately 5 to 20% of the entire length of said vine stake above the tip of said sharp point, there being present along the exterior of the body of said vine stake a plurality of protruding nodules or ruffles for placement of vine branch-tieing ropes or cords.

Figure 1:
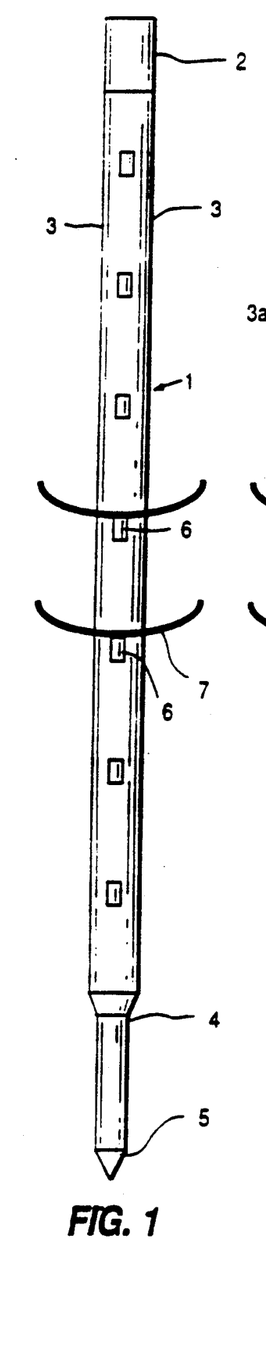
FIG. 1 is a front elevation of the vine stake with nodules.

Referring more particularly to the drawings, FIG. 1 depicts a vine stake 1, at least the top 2 of which is solid, having straight sides 3 over much of its body, terminating in a lower portion with a narrowing neck 4 and a sharply tapered point 5, at least the tip of which is solid in its interior. Nodules 6, typically at least three to about eleven or more nodules, preferably five to seven nodules are distributed vertically along a straight side 3 of the vine stake 1. Vine branch-tieing ropes 7 or cords may rest securely on the nodules 6.

Figures 1A, 2:
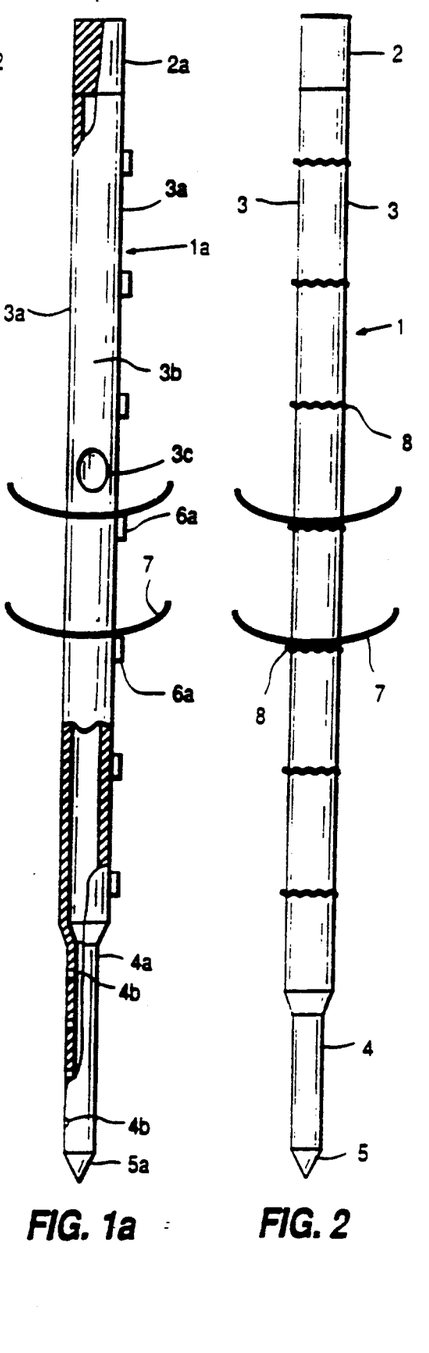
FIG. 1a is a front elevation and partial interior view of the vine stake with nodules, adapted for sub-irrigating vine roots.
FIG. 2 is a front elevation view of the vine stake with ruffles.

In FIG. 1a, vine stake 1a has straight sides 3a, with a hollow core 3b below the solid top 2a and an ingress hole 3c on at least one of the sides 3a, with optionally a second ingress hole (not shown) essentially directly opposite the shown hole 3c. The lower portion comprises a narrowing neck 4a surrounding the hollow core 3b with a plurality of egress holes 4b, typically two to about ten or more, preferably about three to about five, which are preferably positioned on a single side which in use desirably can be turned toward the vine being staked. The sharply tapered point 5a is solid in its interior. Nodules 6a, typically at least three to about eleven or more nodules, preferably five to seven nodules are distributed vertically along straight side 3a of the vine stake. Vine branch-tieing ropes 7 or cords may rest securely on the nodules 6a. Preferably, the egress holes 4b are on the side opposite to the nodules 6a.

Figure 2A:
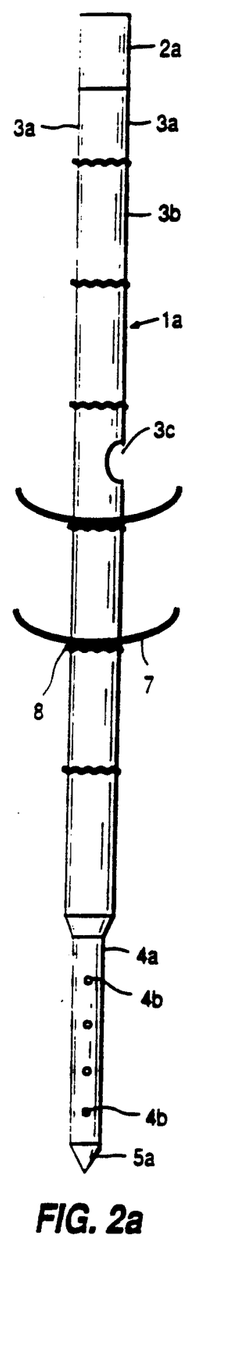
FIG. 2a is a front elevation view of the vine stake with ruffles, adapted for sub-irrigating vine roots.

FIGS. 2 and 2a correspond to FIGS. 1 and 1a except that ruffles 8 typically at least three to about eleven or more, most preferably eight to eleven are present to receive the vine-tieing ropes 7 or cords. The ruffles may protrude outwardly, with the ropes or cords securely resting thereon or may be indented into the sides 3 and 3a, with ropes or cords resting securely therein.

Figure 3:
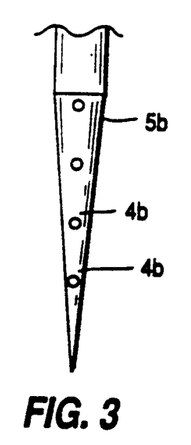
FIG. 3 is a front elevation view of an alternative shape of the lower portion of the vine stake, adapted for sub-irrigating vine roots.
Figures 4, 5:
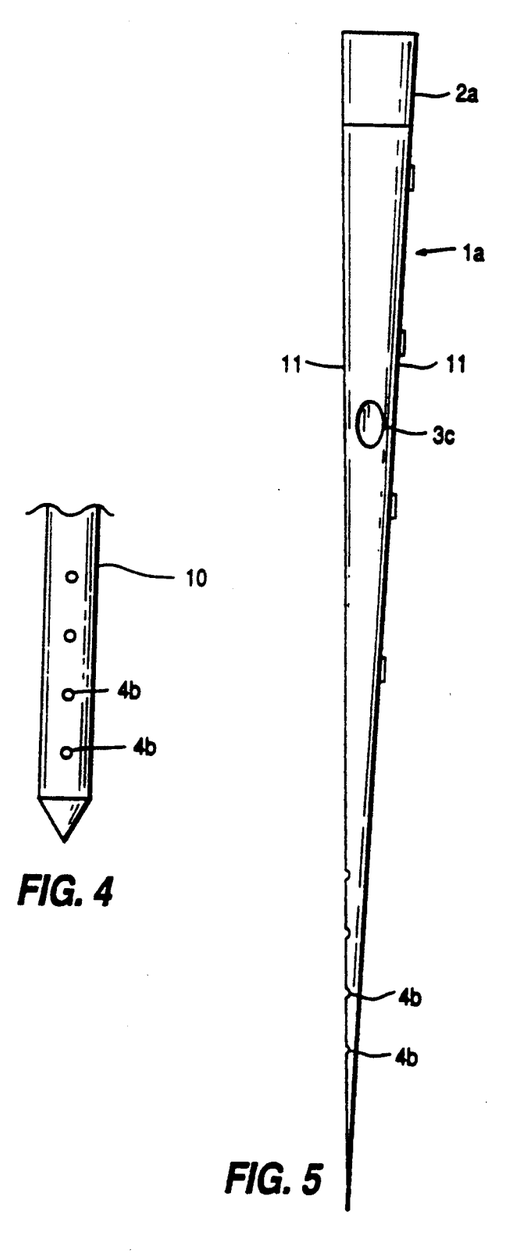
FIG. 4 is a front elevation view of further alternative shape of the lower portion of the vine stake adapted for sub-irrigating vine roots.
FIG. 5 is a front elevation view of a further alternative shape of the vine stake.

In FIG. 3 the bottom portion 5b of FIG. 1a with holes 4b present has a sharply tapered shape. In FIG. 4 the bottom portion continues the line of sides 3a of FIG. 1a, with holes 4b present, and terminates with sharp solid point 5b. In FIG. 5 the entire vine stake is tapered 11 from just below the solid top 2a. It is understood, that FIGS. 3, 4 and 5 also comprehend variants of FIG. 1 in the shapes of FIGS. 3, 4 and 5 with the holes 3c and 4b of FIG. 1a omitted. Variants of FIGS. 3, 4 and 5 with the ruffles 8 and 8a of FIGS. 2 and 2a instead of nodules 7 and 7a are also within the invention.

Figure 6:
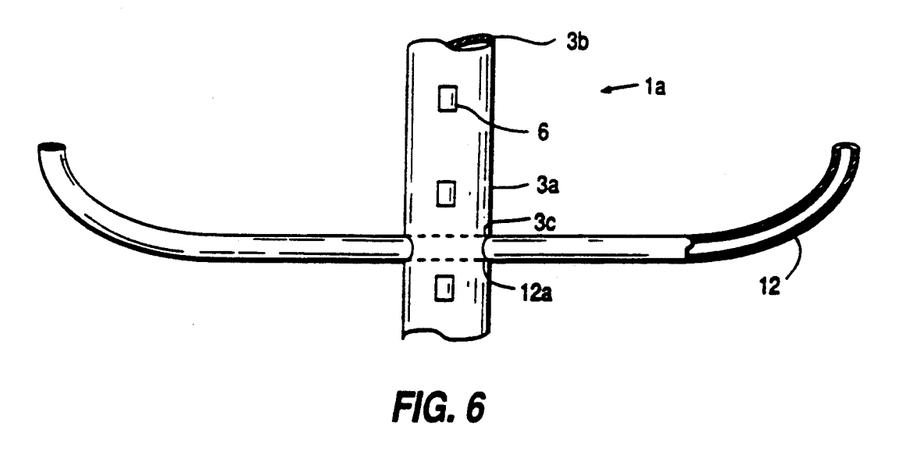
FIG. 6 is a partial front elevation view of the vine stake of FIG. 1a containing handles for pushing the vine stake into the soil.

In FIG. 6 the vine stake of FIG. 1a is modified to adhere to the sides 3a of a pair of oppositely positioned handles 12 placed over the position where ingress hole 3c is present in FIG. 1a as well as opposite thereto (at which an unshown hole of FIG. 1A may also be present, as described above). At least one handle 12, which ends at ingress hole 3c contains opening hole 12a is adherently attached to a side 3a. Thus, the handles 12 assist a person in pushing the vine stake deeply into the soil to readily reach lower levels of vine roots and water or liquid fertilizer can be easily introduced through handle opening hole 12a and into the hollow interior 3b of the vine stake at ingress hole 3c.

Figure 6A:
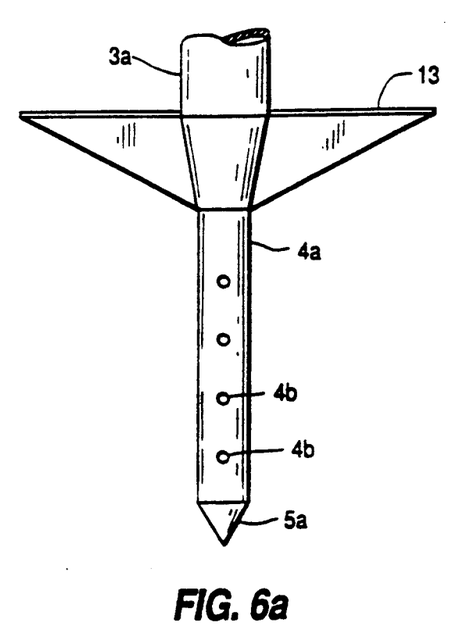
FIG. 6a is a partial front elevation view of the vine stake of FIG. 1a containing foot platforms for pushing the stake into the soil.

In FIG. 6a the vine stake of FIG. 1a is modified to adhere a pair of oppositely positioned foot platforms 13 to sides 3a which assist a person in pushing the vine stake into the soil deeply enough so that foot platforms 13 can rest at ground level.

Figure 6B:
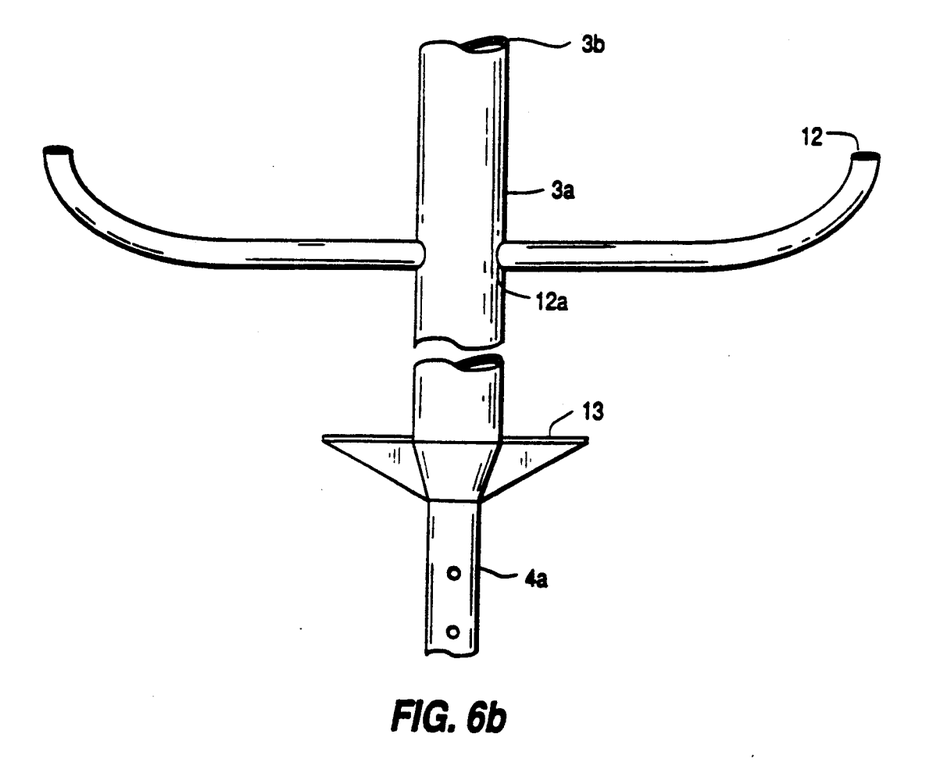
FIG. 6b is a front elevation view of the vine stake of FIG. 1a containing both handles and foot platforms.

In FIG. 6b both the handles 12 with at least one opening hole 12a and foot platforms 13 are present. If there is a second ingress hole present on the stake, both handles would desirably have opening holes.

Figure 7:
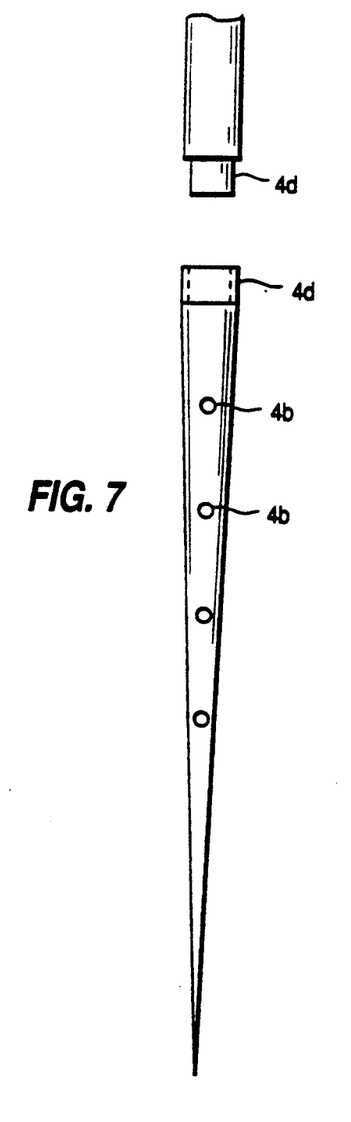
FIG. 7 is a front elevation view of the lower end of the upper portion and of the lower portion of the vine stake adapted for sub-irrigating vine roots, wherein the upper portion is adapted for insertion into the lower portion.

As an alternative to the unitary stake constructions depicted in the previously particularly described FIGS., FIG. 7 depicts insertion of sides 3a into narrowing lower portion 10 at 4d above egress holes 4b. With the insertion in this manner, a multi-part construction is provided with minimal water or liquid fertilizer loss in the insertion area.

Figure 8:
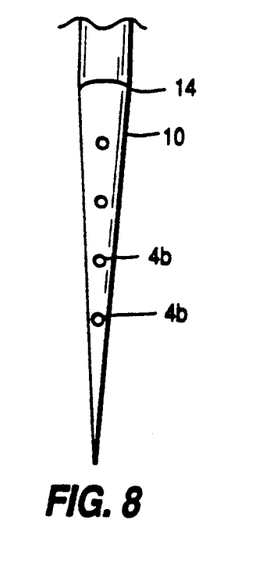
FIG. 8 is a front elevation view of the lower end of the upper portion and of the lower portion of the vine stake adhered to each other.

As a further alternative multi-component construction, FIG. 8 depicts the straight sides 3a adhered or glued to the semi-tapered lower portion 10 at seam 14.

Figure 9:
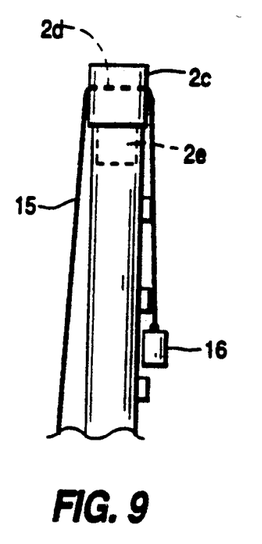
FIG. 9 is a front elevation view of the top of the vine stake wherein a vine tieing rope bearing a weight is attached through a slot in the top of the stake to maintain the vine proximate to the stake.
Figure 9A:
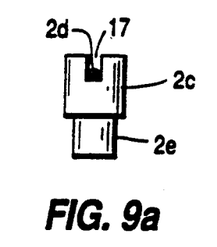
FIG. 9a is a side elevation view of the upper part of FIG. 9.

In FIG. 9 and 9a, on the solid top 2c of the vine stake there is a vine stalk-tieing rope 15 or cord bearing a weight 16 attached to slot 17 to bring a vine proximate to the stake.

The vine stake is advantageously made of light materials which are nevertheless capable of standing up to wind and in rain-softened soil. Plastics such as polyethylene or polypropylene or metals such as anodized aluminum are particularly desirable.

The vine stake may have an entirely solid interior or may be solid for about 6–15, preferably about 4.5–6.5, cm, at its upper end and at its lower point but otherwise have a hollow interior. The hollow interior is present when the vine stake is also adapted for sub-irrigation.

The solid upper portion permits the application of pressure, including hammering, to propel the lower pointed end of the vine stake into the ground. The slot 17, particularly shown in the solid upper portion in FIG. 9a, permits use of a rope or cord-weight assembly for tieing a vine stalk proximately to the stake. The weight is typically about 100–250 grams. The vine stake is sufficiently long so that typically about 30–60 cm desirably penetrate below ground level while typically about 90–180 cm remain above ground adjacent to a planted vine positioned for tieing thereto. When the vine stake is adapted for sub-irrigation, about 30–60 cm are below ground level to assure the ability to provide water or liquid fertilizer close to the vine roots. Preferably the holes below ground are turned toward the vine for best permitting maximum contact with water or liquid fertilizer exiting from the holes below ground with the vine roots.

The sub-irrigating vine stake preferably extends about 105–150 cm above ground, most preferably about 135 cm. It is noteworthy that the sub-irrigating vine stake desirably stands higher above ground than stakes in general use since the ability to effectively sub-irrigate growing vines typically permits higher growing vines than has been usual.

When oppositely positioned foot platforms are present to assist propelling the vine stake into ground, they typically rest with their bottoms at ground level and extend upwardly about 5–10 cm, preferably about 7.5 cm. The foot platforms permit application of foot pressure to increase penetration of the vine stake into the ground without introducing undue pressure which could lead to bending, cracking or breaking of the vine stake.

The ingress hole or oppositely positioned two ingress holes through which water or liquid fertilizer enters into the hollow interior of the unitary or multi-component sub-irrigating vine stake is preferably positioned on the vine stake to be about 45–75 cm, preferably about 55–65 cm, above the ground. This height facilitates easy and comfortable insertion of the water or liquid fertilizer by persons of any height from a watering can or a slow running hose. Moreover, if oppositely positioned handles are employed, they can be attached to the vine stake at the ingress holes or if only one hole is present, at that hole and opposite thereto. These handles permit application of hand pressure to increase penetration of the vine-stake into the ground without introducing undue pressure which could bend, crack or break the vine stake. Further, when the handles are attached to the vine stake at a watering hole or holes, opening holes on the handles permit easy introduction of water or liquid fertilizer. A hose can be easily used to permit introduction of about 0.8–1.3 liters, preferably about 1–1.1 liters, of water or liquid fertilizer in any single feeding.

It is noteworthy that previous sub-irrigating stake devices such as those described in the earlier mentioned U.S. Pat. Nos. 4,745,706 to Muza et al; 3,345,774 to Delbuguet; and 2,809,468 to Eliot, as well as in U.S. Pat. No. 2,333,727 to Lucas, all rely on introducing liquid at the top. Top entry does not permit hammering to penetrate the soil deeply and also can be inconvenient for many people, including children, when the top of the vine stake is high above the ground.

In use the vine stake is typically introduced about 30–45 cm into the soil, about 10–30 cm, preferably about 10–15 cm from the vine by pushing, hammering or, if handles and/or foot platforms are present, by pressure applied thereto. The stake is easily attached to the vine branches (not shown) with vine-tieing ropes or cords which rest securely on nodules or in ruffles of the stake and, if desired, to the vine stalk with the rope or cord-weight assembly described in FIGS. 9 and 9a.

When the vine stake is adapted for sub-irrigation, the egress holes below the ground are preferably positioned toward the vine in order to most effectively have sub-irrigated introduced water or liquid fertilizer reach the vine roots. Further, the bottom of the stake is most preferably introduced about 35-45 cm deep into the soil in order to be near the vine roots. In each feeding, typically about 0.8-1.3 liters, of water or liquid fertilizer exit from the holes below ground after having been introduced into the hole or holes above ground and having proceeded downwardly through the hollow interior of the vine stake to the holes below ground.

The foregoing description is illustrative of the invention and the invention is not limited to exclude from its scope alterations which would be obvious to a person skilled in the art.

I claim:

1. A sub-irrigating vine stake comprising a sharp point at its lower end, a solid flat upper end, a hollow body between the solid bottom of said upper end and the top of the interior of said sharp point, an ingress hole on at least one side of said vine stake entering into said hollow body, said hole being positioned approximately 25 to 40% of the entire length of said vine stake below the top of said upper end, a plurality of egress holes entering into said hollow body near said lower end positioned approximately 5 to 20% of the entire length of said vine stake above the tip of said sharp point, there being present along the exterior of the body of said vine stake a plurality of protruding nodules or ruffles for placement of vine branch-tieing ropes or cords.

2. The vine stake claimed in claim 1 wherein about three to eleven nodules or ruffles are present.

3. The vine stake claimed in claim 1 wherein about three to eleven nodules are present and said egress holes are on a side of said vine stake opposite to the side on which said nodules are present.

4. The vine stake claimed in either of claims 2 or 3 wherein about five to seven nodules are present.

5. The vine stake claimed in claim 2 wherein about three to eleven ruffles are present.

6. The vine stake claimed in claim 1 wherein the lower portion of said vine stake has a narrowing neck or is sharply tapered.

7. The vine stake claimed in claim 1 wherein the entire stake is tapered.

8. The vine stake claimed in claim 1 wherein at least one of (a) oppositely positioned handles are adhered to the sides of said stake, at least one of which ends at said hole on at least one side of said stake entering into said hollow body or (b) oppositely positioned foot platforms are adhered to the sides of said stake.

9. The vine stake claimed in claim 1 wherein said upper end is inserted into said lower end.

10. The vine stake claimed in claim 1 wherein said upper end is adhered or glued to said lower end.

11. The vine stake claimed in claim 1 wherein a slot is present at the top of said solid flat upper end.

12. The vine stake claimed in claim 1 wherein said lower end is about 30 to 60 cm long and said upper end is about 90 to 180 cm long.

13. The vine stake claimed in claim 1 wherein said lower end is about 30 to 60 cm long and said upper end is about 105 to 150 cm long.

14. The vine stake claimed in any of claims 1, 8 to 11 and 14 wherein about two to ten holes are present in said lower end.

15. The vine stake claimed in claim 14 wherein about three to five holes are present in said lower end.

16. A process for sub-irrigating vines comprising providing a sub-irrigating vine stake comprising a sharp point at its lower end, a solid flat upper end, a hollow body between said sharp point and said flat upper end, an ingress hole on at least one side of said vine stake entering into said hollow body, said hole being positioned approximately 25 to 40% of the entire length of said vine stake below the top of said upper end, a plurality of egress holes entering into said hollow body near said lower end positioned approximately 5 to 20% of the entire length of said vine stake above the tip of said sharp point, there being present along the exterior of the body of said vine stake a plurality of protruding nodules or ruffles for placement of vine branch-tieing ropes or cords, propelling the lower pointed end of said vine stake into the ground proximate to a vine with said plurality of egress holes being placed entirely below the ground and said ingress hole remaining above the ground, tieing said vine stake to branches of said vine with ropes or cords securely resting on said nodules or in said ruffles and introducing water or liquid fertilizer into said ingress hole.

17. The process claimed in claim 16 wherein about 0.8 to 1.3 liters of water or liquid fertilizer are introduced.

18. The process claimed in either of claims 16 or 17 wherein a rope or cord has appended to one end thereof a weight of about 100 to 150 grams, said rope or cord passes through a slot in said solid flat upper end and has the other end of said rope or cord tied to the stalk of said vine.

* * * * *